(12) United States Patent
Lert, Jr.

(10) Patent No.: US 9,802,759 B2
(45) Date of Patent: Oct. 31, 2017

(54) MATERIALS-HANDLING SYSTEM USING AUTONOMOUS TRANSFER AND TRANSPORT VEHICLES

(71) Applicant: SYMBOTIC, LLC, Wilmington, MA (US)

(72) Inventor: John G. Lert, Jr., Wakefield, MA (US)

(73) Assignee: Symbotic, LLC, Wilmington, MA (US)

( * ) Notice: Subject to any disclaimer, the term of this patent is extended or adjusted under 35 U.S.C. 154(b) by 206 days.

(21) Appl. No.: 14/336,829

(22) Filed: Jul. 21, 2014

(65) Prior Publication Data

US 2015/0071743 A1 Mar. 12, 2015

Related U.S. Application Data

(63) Continuation of application No. 12/563,940, filed on Sep. 21, 2009, now Pat. No. 8,784,034, which is a continuation of application No. 10/928,289, filed on Aug. 28, 2004, now Pat. No. 7,591,630.

(60) Provisional application No. 60/498,688, filed on Aug. 29, 2003.

(51) Int. Cl.
*B65G 1/137* (2006.01)
*B65G 1/04* (2006.01)

(52) U.S. Cl.
CPC ......... *B65G 1/0492* (2013.01); *B65G 1/1378* (2013.01); *B65G 2201/0261* (2013.01)

(58) Field of Classification Search
CPC B65G 2209/06; B65G 1/0492; B65G 1/1378; B65G 1/0414; B65G 1/045; B65G 1/065; B65G 1/137; B65G 1/1373; B65G 2201/0261
See application file for complete search history.

(56) References Cited

U.S. PATENT DOCUMENTS

| | | |
|---|---|---|
| 2,693,770 A | 11/1954 | Hubscher |
| 2,717,088 A | 9/1955 | Morley |
| 2,743,486 A | 5/1956 | Grayek |
| 3,526,327 A | 9/1970 | Atwater |
| 3,734,311 A | 5/1973 | Thompson et al. |
| 3,738,506 A | 6/1973 | Comford et al. |
| 3,746,130 A | 7/1973 | Bullas |
| 3,762,531 A | 10/1973 | Lee |

(Continued)

FOREIGN PATENT DOCUMENTS

| | | |
|---|---|---|
| EP | 0133472 | 2/1985 |
| FR | 2730715 | 8/1996 |

(Continued)

*Primary Examiner* — Glenn Myers
(74) *Attorney, Agent, or Firm* — Perman & Green, LLP

(57) ABSTRACT

Methods and apparatus for selecting and combining items in an outbound container through the use of autonomous vehicles, each of which includes means for automatically loading and unloading a payload, to perform both transfer and transport functions in moving containers of items within a workspace via a network of roadways. Under computer control, said autonomous vehicles transfer and transport case containers of item units between incoming receiving stations, intermediate storage locations, and outgoing order-assembly stations where entire containers or individual item units are combined in the outbound container.

16 Claims, 11 Drawing Sheets

(56) References Cited

U.S. PATENT DOCUMENTS

| | | | | |
|---|---|---|---|---|
| 3,846,947 A | * | 11/1974 | Short | E04H 5/02 52/236.3 |
| 3,927,773 A | | 12/1975 | Bright | |
| 4,221,077 A | | 9/1980 | von Winckelmann | |
| 4,274,794 A | | 6/1981 | Olson | |
| 4,428,708 A | | 1/1984 | Burt | |
| 4,492,504 A | | 1/1985 | Hainsworth | |
| 4,669,047 A | | 5/1987 | Chucta | |
| 4,678,390 A | * | 7/1987 | Bonneton | B65G 1/1375 294/4 |
| 4,724,640 A | * | 2/1988 | Patane | B65G 1/0407 414/267 |
| 4,786,229 A | | 11/1988 | Henderson | |
| 4,850,783 A | * | 7/1989 | Maekawa | B65G 61/00 186/55 |
| 4,878,876 A | | 11/1989 | Ishimoto | |
| 5,067,932 A | | 11/1991 | Edwards | |
| 5,135,344 A | | 8/1992 | Kita | |
| 5,169,284 A | * | 12/1992 | Berger | B65G 47/907 294/87.1 |
| 5,186,281 A | | 2/1993 | Jenkins | |
| 5,211,523 A | * | 5/1993 | Galan | B60L 3/04 180/168 |
| 5,218,909 A | | 6/1993 | Ng | |
| 5,226,782 A | | 7/1993 | Rigling | |
| 5,228,820 A | | 7/1993 | Stansfield | |
| 5,273,392 A | | 12/1993 | Bernard et al. | |
| 5,370,492 A | | 12/1994 | Gleyze | |
| 5,380,139 A | | 1/1995 | Pohjonen | |
| 5,403,147 A | | 4/1995 | Tanaka | |
| 5,405,232 A | | 4/1995 | Lloyd et al. | |
| 5,425,612 A | | 6/1995 | Ebstein | |
| 5,472,309 A | | 12/1995 | Bernard et al. | |
| 5,478,183 A | | 12/1995 | Savigny | |
| 5,564,879 A | | 10/1996 | Noguchi | |
| 5,595,263 A | | 1/1997 | Pignataro | |
| 5,595,264 A | | 1/1997 | Trotta, Jr. | |
| 5,601,395 A | | 2/1997 | Lichti et al. | |
| 5,642,976 A | | 7/1997 | Konstant | |
| 5,669,748 A | | 9/1997 | Knudsen | |
| 5,707,199 A | | 1/1998 | Faller | |
| 5,718,551 A | | 2/1998 | Ebstein | |
| 5,720,157 A | | 2/1998 | Ross | |
| 5,839,872 A | | 11/1998 | Goto et al. | |
| 5,877,962 A | | 3/1999 | Radcliffe | |
| 5,890,136 A | | 3/1999 | Kipp | |
| 5,903,464 A | | 5/1999 | Stingel et al. | |
| 5,928,058 A | | 7/1999 | Francis | |
| 5,933,814 A | | 8/1999 | Rosenberg | |
| 5,953,234 A | * | 9/1999 | Singer | B65G 1/0485 414/789.6 |
| 6,061,607 A | | 5/2000 | Bradley et al. | |
| 6,062,942 A | | 5/2000 | Ogihara | |
| 6,135,697 A | | 10/2000 | Isaacs et al. | |
| 6,325,586 B1 | | 12/2001 | Loy | |
| 6,332,098 B2 | | 12/2001 | Ross et al. | |
| 6,439,955 B1 | | 8/2002 | Feketo | |
| 6,602,037 B2 | | 8/2003 | Winkler | |
| 6,687,568 B2 | * | 2/2004 | Ohtsuka | B65G 1/137 104/88.01 |
| 6,729,836 B2 | | 5/2004 | Stingel et al. | |
| 6,748,292 B2 | | 6/2004 | Mountz | |
| 6,788,996 B2 | | 9/2004 | Shimizu | |
| 6,854,583 B1 | | 2/2005 | Horn | |
| 6,895,301 B2 | | 5/2005 | Mountz | |
| 6,929,440 B1 | | 8/2005 | Grond | |
| 6,974,928 B2 | | 12/2005 | Bloom | |
| 7,097,045 B2 | | 8/2006 | Winkler | |
| 7,155,304 B1 | | 12/2006 | Charych | |
| 7,695,235 B1 | | 4/2010 | Rallis | |
| 8,428,771 B2 | | 4/2013 | Schaefer | |
| 8,634,954 B2 | | 1/2014 | Schafer | |
| 2002/0045954 A1 | | 4/2002 | Nose et al. | |
| 2004/0016684 A1 | | 1/2004 | Braginsky et al. | |
| 2004/0128928 A1 | * | 7/2004 | Stagner | E04H 6/10 52/236.3 |
| 2004/0247421 A1 | | 12/2004 | Saunders et al. | |
| 2004/0249497 A1 | | 12/2004 | Saigh et al. | |
| 2005/0055939 A1 | * | 3/2005 | Wolgemuth | E04H 14/00 52/506.01 |
| 2006/0051190 A1 | | 3/2006 | Taguchi | |
| 2006/0229762 A1 | | 10/2006 | Schaefer | |
| 2009/0074545 A1 | | 3/2009 | Lert, Jr. et al. | |
| 2010/0049360 A1 | | 2/2010 | Stemmie | |
| 2010/0076591 A1 | | 3/2010 | Lert, Jr. | |
| 2010/0316468 A1 | | 12/2010 | Lert et al. | |

FOREIGN PATENT DOCUMENTS

| | | |
|---|---|---|
| JP | 07004408 | 1/1995 |
| JP | 7033219 | 3/1995 |
| JP | 09278117 | 10/1997 |
| JP | 2004099272 | 2/2004 |
| JP | 2007153490 | 6/2007 |
| JP | 2007323471 | 12/2007 |

\* cited by examiner

MATERIALS-HANDLING SYSTEM USING AUTONOMOUS TRANSFER AND TRANSPORT VEHICLES

CROSS REFERENCE TO RELATED APPLICATIONS

This application is a continuation of U.S. Non-provisional patent application Ser. No. 12/563,940 (now U.S. Pat. No. 8,784,034) filed Sep. 21, 2009, which is a continuation of U.S. Non-provisional patent application Ser. No. 10/928,289 (now U.S. Pat. No. 7,591,630), filed Aug. 28, 2004, which claims the benefit of U.S. Provisional Patent Application No. 60/498,688, filed on Aug. 29, 2003, the disclosures of which are incorporated by reference herein in their entireties.

FIELD OF THE INVENTION

The present invention relates to materials-handling systems and methods in general, and more specifically to the systems and methods used to selectively pick cases and individual items of merchandise to fulfill orders within retail distribution systems.

BACKGROUND OF THE INVENTION

Retail distribution systems handle merchandise at three basic levels of aggregation. The first and most granular level is the individual item unit as packaged for sale to consumers. The second level is the "case", the container that is filled with item units at the factory, sealed, and then unsealed either at the store when the items are placed onto shelves or at an order-fulfillment center where items are to be picked to fill customer orders. The third level of aggregation is the pallet, onto which multiple cases are stacked for bulk shipping, typically by truck.

By far the most pervasive materials-handling process within any retailer's distribution system is the selective retrieval ("picking") of merchandise from inventory—either cases or individual item units—to fill orders. Yet, despite a steadily increasing level of automation of various materials-handling processes, order-picking remains a mostly manual and labor-intensive process, generally using some variant of the relatively inefficient "man-to-goods model".

In high-volume retail channels, the standard ordering unit for store-level replenishment is the case. Case-picking to fill store orders (or "order selection", as it is usually called) occurs in retail distribution centers ("DCs"). Merchandise arrives at the DC from manufacturers or intermediate suppliers on pallets, each pallet typically containing cases of a single product. The task of the DC is to ship to the stores pallets containing a specified number of cases of many different products. The primary method used to transfer cases from incoming pallets to outgoing pallets is a manual process that has changed little over many decades: single-product pallets are placed at picking locations arranged in opposing rows separated by aisle spaces, and human operators ("selectors") travel on motorized vehicles through those aisles, building mixed pallets as they go. On board each vehicle are one or more (typically two) pallets, and the job of the selector is to drive the vehicle to a series of single-product pallets and place a specified number of cases of each product on the specified outbound pallets. There have been attempts to use machines to automate case selection, but none has enjoyed significant commercial success to date, and manual case-selection is used in the vast majority of retail distribution centers in operation today.

Picking of individual item-units occurs at various points in retail distribution. For example, DCs that supply stores whose physical size and sales volumes are too small for case-quantity replenishment must ship individual item units. Types of stores that are usually replenished in less-than-case-quantity include convenience, drug, and specialty goods. In addition, there is an ever-increasing demand for item-level picking to fill orders that are delivered directly to end-users or consumers, driven largely by the growth in "e-commerce", i.e. electronic orders placed from personal computers via the Internet. A variety of "man-to-goods" methods are used to perform item-level picking. In applications where the picking volume is low or the product assortment is limited, the model is very similar to that used in case-level order-selection described above (or by shoppers in a self-service store), with pickers taking containers to item locations to make the picks. In applications with higher volume and wider product assortment, "zone" picking is more typical, with each picker stationed in a designated area, or zone, and responsible for picking all ordered items in that area and placing them into containers (e.g., boxes or totes) that move through the zone on conveyors.

Depending on the application and configuration of the order-fulfillment process, pickers in a typical "man-to-goods" process spend only 15% to 30% of their work time actually picking the items and placing them either on a pallet or in a container. The rest of their time is spent traveling to the picking locations, ensuring that the target pick is the right item, ensuring the right number of items have been picked, or just waiting to perform the next transaction. A number of technologies, such as barcode scanning, voice direction, and pick-to-light have been developed that improve accuracy and improve productivity of non-travel tasks, but the only way to achieve dramatic improvements in labor efficiency is to use a "goods-to-man picking" model in which the goods to be picked flow to stationary workstations. There have been efforts to create goods-to-man item-picking models, most notably through the use of carousels and automated storage-and-retrieval cranes, but these solutions are typically very expensive and have not been widely adopted.

Of course, by far the most prevalent form of item-picking in retail is that performed by customers shopping in self-service stores—indeed the very term "self-service" refers specifically to the process of customers picking their own orders. There have also been attempts to create a new retail operating model—an automated full-service store—by automating this item-picking process. This operating model would have numerous advantages over the self-service model, as it would simultaneously enable much more efficient and effective operations by the retailer and provide a much more enjoyable and time-efficient shopping experience to the customer. Some examples of attempts to create this retail operating model include U.S. Pat. Nos. 3,746,130 and 5,890,136 and 5,595,263 and 5,933,814 and 5,595,264 and 5,186,281. Unfortunately, none of these attempts to automate order-fulfillment in a retail store has been successful, primarily because a material-handling system has never existed that can satisfy the very challenging requirements of this application effectively and affordably.

The objective of the present invention is to provide, for the first time, a materials-handling system that allows a high degree of automation in the picking of orders at both case-level and item-level, and to automate item-level order picking so effectively that it can be used for real-time order-picking in an automated full-service retail store.

BRIEF DESCRIPTION OF THE DRAWINGS

In the detailed description which follows, frequent reference will be made to the attached drawings, in which.

DETAILED DESCRIPTION

Overview

Figure 1A:
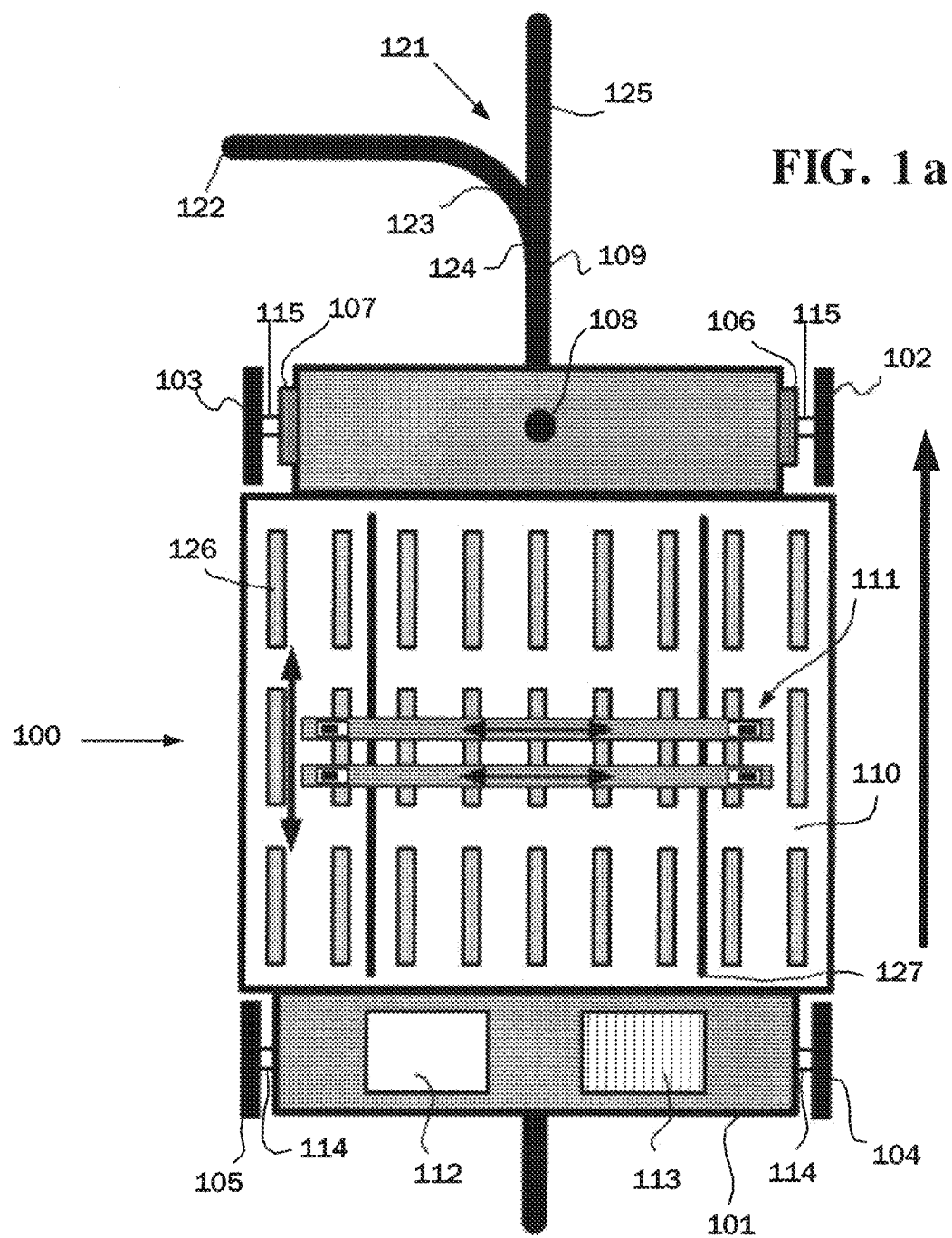
FIG. 1a, FIG. 1b, and FIG. 1c are top, side, and front views, respectively, of the preferred embodiment of the autonomous transfer and transport vehicle.

In the preferred embodiment of the present invention, a materials-handling system designed to pick orders uses autonomous vehicles to handle single cases of merchandise and perform the functions of both (1) transferring cases into and out of storage locations (e.g., a rack) and (2) transporting the cases within the work facility. In most prior-art systems these two functions are typically performed by separate subsystems, such as an automated storage-and-removal system combined with conveyors. In the present invention, each autonomous vehicle is equipped with two transfer-arm assemblies that together move a single-case payload laterally onto and off of its payload bay, and with propulsion and guidance mechanisms that enable the vehicle to carry its payload from location to location within the workspace. Combining both transfer and transport functions within a single subsystem greatly simplifies the overall design and operation of the system, thereby reducing costs, increasing reliability, and providing design flexibility in addressing application-specific system requirements.

The approach solves the order-picking problem by enabling a "goods-to-man" picking model that is far more labor efficient than the conventional "man-to-goods" model, and much less expensive and more effective than previous solutions. Incoming cases of merchandise are depalletized, transported individually into holding storage by the transfer/transport vehicles, and then selectively retrieved and transported by those same vehicles to order-assembly workstations, either pallet-building stations or item-pick-and-pack stations. If the workstations are manual, labor is used much more productively because all of the time is spent is picking and placing. Moreover, this model makes it possible eventually to replace the human operator altogether with a robotic picker or pallet-building machine in a totally automated "goods-to-robot" model.

While each vehicle is designed to handle only single cases, a key aspect of the present invention is "massively parallel" operation: a given system will use many of these vehicles to achieve the necessary level of total system throughput, all operating independently of each other. For example, if a single vehicle can perform an average of 50 case-transactions per hour, a system with 200 vehicles would have a theoretical throughput capacity of 10,000 case-transactions per hour, though in actual practice total system throughput degrades somewhat as additional vehicles are added due to collision-avoidance and congestion delays.

The use of track-guidance of the vehicles is optional but highly advantageous in order to maximize speed of travel with the simplest possible vehicle design. Track-guidance allows safe travel at high speed by mechanically controlling the path of vehicular motion without complex guidance-control and navigational systems. High-speed travel is important to maximizing throughput capacity, since the throughput of each vehicle is a function of how fast it can travel from one point to another, and simplicity of vehicle design is an important factor in minimizing system cost and maximizing reliability.

Track-guidance can take a variety of forms, however, and in this application the best by far is a slotted "guideway", i.e. a roadway with a guide-slot in the center into which extends a guide pin attached to the vehicle. In order for vehicles to have random access to multiple locations within a facility, a key element of the preferred embodiment is a network of guideways interconnected by branching points where the vehicles can change guideways. With slot-guidance, the wheels of the vehicle can simply roll over the slot, so branching can be achieved with a purely passive guideway (i.e. no active switches), and extremely simple steering means on the vehicle that controls which of two conjoined slots the guide-pin enters.

For the sake of brevity and in keeping with George Lucas' alphanumeric naming convention for robots, the Track-guided Transfer and Transport Vehicle of the preferred embodiment is called "T3V".

A multi-level storage structure holds the cases of merchandise that are the picking stock available to fill orders. Each level of this structure has multiple picking aisles consisting of opposing storage racks separated by T3V guideways. The guideways are interconnected so that T3Vs have random access to the cases of merchandise. T3Vs are able to elevate themselves to upper levels of the storage structure by means of ramps, which are a highly advantageous alternative to the use of mechanical lifts that are more expensive and create bottlenecks and additional point of potential failure.

Another optional but very beneficial element of the preferred embodiment of the present invention is the use of a "carrier tray" to contain the cases of merchandise so that T3Vs manipulate the carrier trays instead of the cases themselves. The carrier tray serves two important purposes. First, it creates a standard mechanical interface to the payload-transfer mechanism on the T3V, isolating it from the wide variations in sizes, shapes, and materials of the cases being handled. This results in a transfer mechanism that is much simpler, less expensive, and more reliable in operation than one which must be able to manipulate cases directly. The second advantage of the carrier tray is the containment of any spillage or leakage of item contents in the case. This benefit is especially important given the difficulty of cleaning up the messes in the storage structure that would result from uncontained spills and leaks, and the consequent impact on operations.

T3Vs enable a novel and highly efficient operating model for a retail DC in which the picking-stock is first depalletized and the individual cases are inserted into carrier trays, picked up by T3Vs and transported into the storage structure. Cases are then selectively retrieved by T3Vs and transported to pallet-building workstations, offloaded by T3Vs, removed from the carrier trays, and placed onto the mixed pallets for eventual delivery to stores. It is or will soon be possible for all of the processes on both sides of T3V activity to be performed by robots or other machines, so that the operation of the entire DC can be completely automated.

A very similar operating model can be used for item-level picking in an order-fulfillment center or small-store distribution center. Cases are depalletized and then have their tops removed to expose the individual item units for picking. These open cases are then inserted into carrier trays, picked up by T3Vs and transported into the storage structure. Cases are then selectively retrieved by T3Vs and transported to pick-and-pack workstations where individual item units are removed from their cases and placed into containers (totes, boxes, bags, etc.) for delivery to the end user. Cases are then returned to storage unless empty. At the current time, the actual picking of the item is believed to be beyond the capabilities of affordable robots and must be performed by humans, though at maximum labor efficiency.

The T3V is such an effective solution to the problem of automating item-picking that it also for the first time makes practicable real-time order fulfillment in the automated retail store. In the preferred embodiment of this operating model, the store is basically an item-level order-fulfillment facility combined with a shopping section in which products for sale are displayed for customers to evaluate. Rather than collecting items for checkout, customers order items via a shopping terminal to be picked by the T3V system.

Design Detail

Figure 1B:
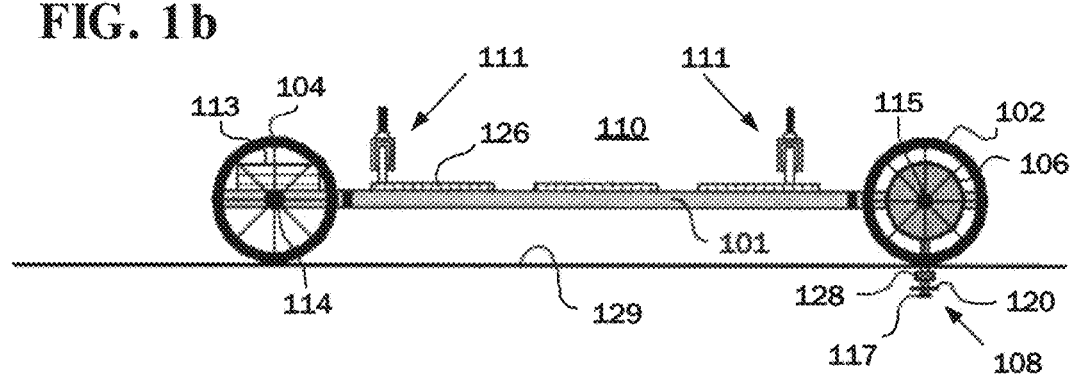
Figure 1C:
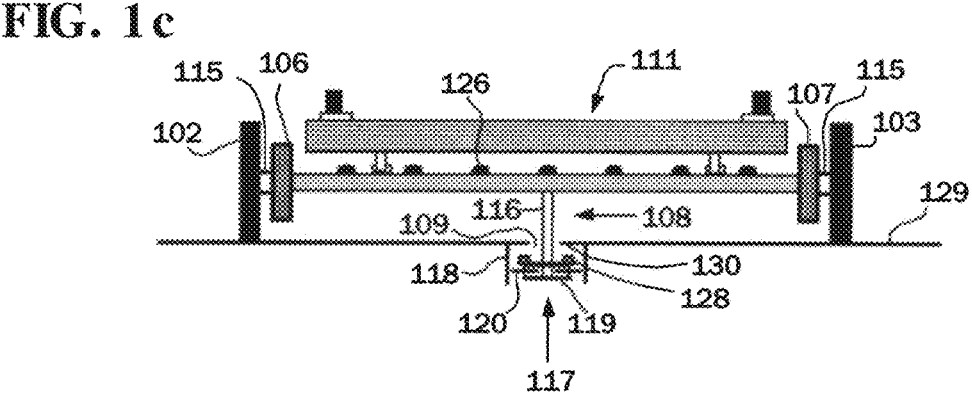

The preferred embodiment of the T3V (100) is depicted in FIG. 1a (top view), FIG. 1b (side view), and FIG. 1c (front view). The vehicle has a chassis frame (101), to which are attached the following major elements of the vehicle:

(a) four wheels, two of which are drive wheels (102, 103) and the other two of which are free turning (104, 105);

(b) two drive motors (106, 107) that propel the vehicle by directly driving each of the two drive wheels (102, 103), and also provides braking by reversing thrust electronically;

(c) a guide-pin assembly (108) at the front of the vehicle that engages the slot (109) in the guideway to control direction of vehicular movement;

(d) a payload bay (110) that holds cases in carrier trays;

(e) two transfer arms (111) that physically pull carrier trays onto the payload bay (110) and pushes them off;

(f) an electronics module (112) containing an embedded control computer and related interface circuitry, including a wireless local-area network interface by which the embedded computer communicates with a system master computer;

(g) sensors that provide information to the control computer, especially about the external environment, such for reading location markers or aligning the transfer arms with a target carrier tray in preparation for a payload transfer;

(h) a rechargeable battery and related power-conditioning and distribution circuitry (113), along with connection to external power.

In the preferred embodiment of the T3V, the drive wheels (102, 103) are at the front of the vehicle along with the guide-pin (108), and two drive motors (106, 107) are used, one for each drive wheel. While a single-motor design is certainly feasible, the use of two direct drive motors has the advantage of mechanical simplicity. For example, there is no need for a drive transmission and differential, nor is a mechanical steering system needed since a lateral steering force can be created by turning the drive wheels at different speeds. The use of brushless-DC drive motors, either single or dual, also eliminates the need for mechanical brakes since the direction of force applied to the motor's output drive shaft is reversed by reversing the polarity of the electrical current supplied to the motor, so the motor can be used both for propulsion and for braking depending on polarity of current flow. Elimination of these mechanical components also increases system reliability since brushless-DC drive motors typically have extremely low failure rates.

In the preferred embodiment, then, each rear wheel (104, 105) is simply bolted to the chassis (101) through a hub bearing (114) that allows the wheel to turn freely. At the front of the vehicle, it is the two drive motors (106, 107) that are attached directly to the chassis (101), and each wheel (102, 103) is attached to the rotating output drive shaft (115) of one of the motors. A problem often encountered with a direct-drive electric motor is the lack of torque at low RPM normally provided by the mechanical advantage of a conventional transmission system. This problem is solved in the preferred embodiment by the use of a drive motor based on the teachings in U.S. Pat. No. 5,067,932, which can apply maximum torque to the drive shaft at any speed.

As stated earlier, slot-guidance of the T3V is optional but is used in the preferred embodiment to enable high vehicular speeds without the cost and design complexity that would be required by unconstrained self-guidance and -navigation. The key objectives in the design of the slot-guideway and guide-pin assembly are to minimize mechanical stress and frictional wear that will tend to result from high-speed travel. In the preferred embodiment shown in FIG. 1b and FIG. 1c, the guideway consists of a slot (109), or gap, in the center of the roadway (129), below which is a channel formed by opposing vertical sidewalls (118) on each side of the slot (109) extending down from the roadway (129). The guide-pin assembly (108) consists of a guide-pin shaft (116) that is attached at the top to the chassis (101) and extends down into the slot guideway (109), and a pin-tip subassembly (117) attached to the end of the shaft (116) that actually engages the guideway mechanically by making contact with a vertical sidewall (118) extending down from underneath the roadway (129) surface. The pin-tip assembly (117) consists of a bracket (119) that is bolted to the end of the guide-pin shaft (116) and holds two contact wheels (120), one on each side of the guideway, which spin horizontally when the wheel (120) comes into contact the vertical sidewall (118) as the vehicle is moving so as to minimize friction between the guide-pin assembly and the guideway that would otherwise result in significant wear and tear at high vehicle speeds. Thus, when a contact wheel (120) makes contact with the sidewall (118), frictional energy is converted to rotational energy through the spinning of the wheel. The materials used for both the contact wheel (120) and the sidewall (118) should have very low friction coefficients and be wear-resistant. Of the two, the sidewall material should be the harder and more wear-resistant so that wear and tear will primarily occur in the contact wheels, which are readily replaceable, rather than the sidewalls, which are not. It should also be noted that the guide-pin assembly (108) should preferably be positioned in the center of a line connecting the hubs of the two drive wheels (102, 103), due to the use of ramps, so that the pin-tip assembly (117) will always be at the same vertical elevation as the drive wheels.

If T3Vs were required only to travel on a single closed-loop guideway like a typical toy slot-car racer, no additional directional control would be needed other than the interaction of the guide-pin assembly (108) in the guideway slot (109). However, since the order-picking solution absolutely requires T3Vs to have random access to as many storage locations as possible, the T3Vs must be able to change guideways in the course of navigating to a selected location. This capability is provided by a network of interconnected guideways featuring forks where two guideways connect, and by providing the T3V with the capability of selecting which of the two guideways to take when moving through a fork. U.S. Pat. No. 5,218,909 describes one method for providing this switching capability in a slot-car racer by moving the guide-pin vertically to either pass over (in the raised position) or engage (in the dropped position) a sub-surface diverting element in the track. While this method could certainly be used in an embodiment of the present invention, a simpler and more reliable approach is used in the preferred embodiment which takes advantage of the steering effect of a force differential between the two drive wheels.

A fork in the guideway is formed when a first guideway is conjoined with a second intersecting guideway. As depicted in FIG. 1a, for example, a fork (121) is formed when a first guideway slot (109) is joined by a second guideway slot (122) that runs perpendicular to the first. In the preferred embodiment, the segment (123) of the second slot (122) that merges with the first slot (109) is an arc, or curve, that allows a smooth turn in the transition from the first guideway slot (109) to the second (122). It is always the case at a fork that one side of the first slot (109) is contiguous only with itself, i.e. the corresponding side of the continuation of the same slot beyond the fork, while the other side of the first slot (109) is contiguous only with the corresponding side of the second slot (122). Where the second slot (122) is intersecting from the left (from the point of view of the T3V facing forward), as shown in FIG. 1a for example, the right side of the first slot (109) is contiguous to itself, while the left side of the first slot (109) is contiguous with the left side of the second slot (122), joining it at the point (124) where the arced segment (123) of the second slot (122) merges with the first slot (109). Where the second slot intersects from the right, the relative sides are reversed.

This feature makes it possible for the T3V (100) to select which guideway to take at a fork by applying a lateral force to the guide-pin assembly (108) as it moves through the fork (121) to keep the pin-tip assembly (117) in contact with the sidewall (118) contiguous to the selected slot. In the preferred embodiment, this lateral force is generated by means of a differential in the forces acting upon the two drive wheels (102, 103), as is explained more fully below. There are, of course, other ways to create this lateral force, such as a mechanical means for physically displacing a movable guide-pin, similar to the mechanism used in U.S. Pat. No. 5,928,058 for causing a toy slot-car racer to shift lanes, or by using a conventional steering mechanism that turns wheels to change direction.

To further understand how the T3V selects between two guideways at a fork, consider what happens when the T3V (100) in FIG. 1a moves through the fork (121). When the guide-pin is approximately at the point (124) of contiguity between the two slots (109, 122), the drive motors (106, 107) produce a differential in forces acting upon the drive wheels (102, 103), for example by applying a braking force to one wheel while applying power to the other, which results in a lateral force on the guide-pin in the direction toward the lesser-powered wheel, pressing the pin-tip assembly (117) against the sidewall (118) on that side of the slot. If the T3V is to go straight at the fork, i.e. remain on the first guideway, the drive motor (106) on the right side of the vehicle brakes its drive wheel (102), while the drive motor (107) on the left side of the vehicle holds constant or increases the power it is applying to its drive wheel (103). The pin-tip assembly (117) is pressed against the right sidewall (118) as the T3V moves through the fork (121), so that the guide-pin assembly (108) remains engaged in the first slot (109) and the T3V continues on the same guideway. Once the guide-pin has moved past the point (125) that marks the end of the fork (121) and the continuation of the first slot (109), power is once again applied by the right-side drive motor (106) to the right drive wheel (102) to equalize the forces acting upon the two drive wheels and continue moving the T3V in a straight line.

On the other hand, if the T3V (100) is to turn left at the fork (121), i.e. transfer to the second guideway, the opposite maneuver is performed. As the guide-pin assembly (108) moves past the point (124) of contiguity between the two slots (109, 122), the left-side drive motor (107) applies a braking force to its wheel (103), while the right-side drive motor (106) holds constant or increases the power applied to its drive wheel (102). The pin-tip assembly (117) is then presses against the left sidewall (118) of the first slot (109) and follows the curve of the sidewall into the second slot (122) and the T3V will begin making the left-hand turn. Once the guide-pin assembly (108) is fully inserted into the second slot (122), the braking force on the left-side drive wheel (103) can be released, but because the T3V is now in the process of making a left turn, the inside and outside wheels must still turn at different speeds. The inside (left) drive wheel (103) is allowed to turn freely, with no power applied, while power is still applied to the outside (right) drive wheel (102). When the guide-pin reaches the end of the curved segment (123) and the beginning of the straightaway, the left-side drive motor (107) resumes powering its drive wheel with equal force to that of the right-side drive motor (106), so that the wheels now turn at the same speed and propel the T3V in a straight line. (Note that whenever the T3V is going through a turn, the drive motor on the outside wheel applies power but the drive motor on the inside either lets its wheel turn freely or, when entering a turn at a fork, applies a braking force.)

In the preferred embodiment of the T3V, all of the space between the front and rear wheels is used for the payload bay (110) which holds a carrier tray being transported by the T3V. The floor of the payload bay (110) has passive rollers (126) to minimize resistance to the lateral movement of carrier trays during the transfer process. Also mounted to the floor of the payload bay are two tracks (127) that run longitudinally from front to back, onto which are movably attached the two transfer arms (111), by means of which the T3V transfers payloads from a base platform onto its payload bay and from the payload bay to a base platform. (For purposes of this description, the term "base platform" can refer to any horizontal support structure, such as a shelf-like storage rack, a conveyor, a lift, etc.) There are many possible designs of an operable payload-transfer mechanism, such as those taught in U.S. Pat. No. 5,380,139. A key design factor, of course, is whether the transfer mechanism must manipulate cases of merchandise directly, or, as recommended in the preferred embodiment, it only manipulates a container which holds the case of merchandise, called herein a carrier tray. In the case of the former, a vacuum suction device or mechanical gripper might be used, but the task becomes significantly simpler with the use of the carrier tray. In the preferred embodiment of the T3V, the payload-transfer mechanism is implemented as two telescoping transfer-arm assemblies (111) which simultaneously extend to the side of the T3V to transfer payloads (carrier trays containing cases) on and off the payload bay (110).

Figure 2A:
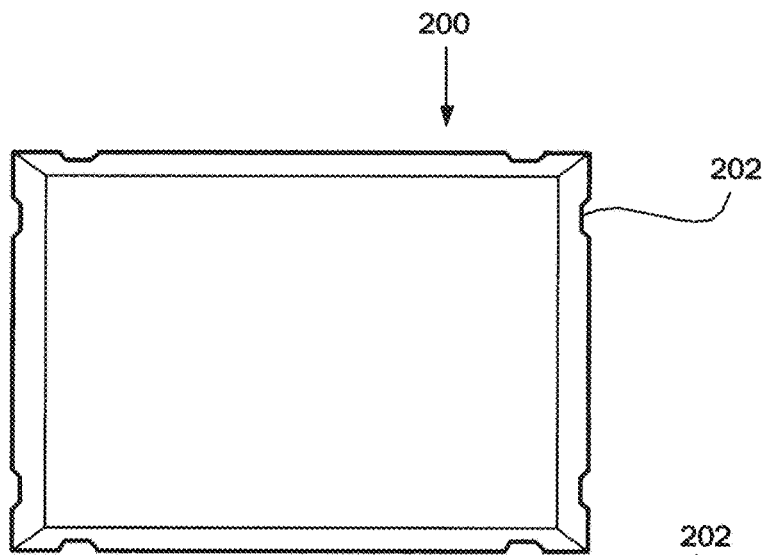
FIG. 2a and FIG. 2b are top and side views, respectively, of an example of a carrier tray used in the preferred embodiment.
Figure 2B:
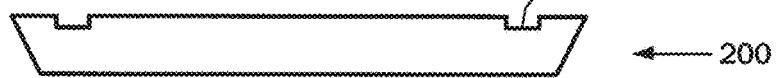

An example of a carrier tray (200) is shown in FIG. 2a (top view) and FIG. 2b (side view). It is a relatively shallow tray, preferably made of a plastic material, with side walls (201) that are tapered slightly so that empty trays can be nested for storage, and features that are used by the transfer mechanism to manipulate the tray. In the preferred embodiment, these manipulating features are notches (202) in the rim of the tray, one notch at the top of each end of the four sidewalls (201), or eight notches in total, so that the carrier tray can be manipulated in any orientation relative to the transfer arms (111).

Figure 3:
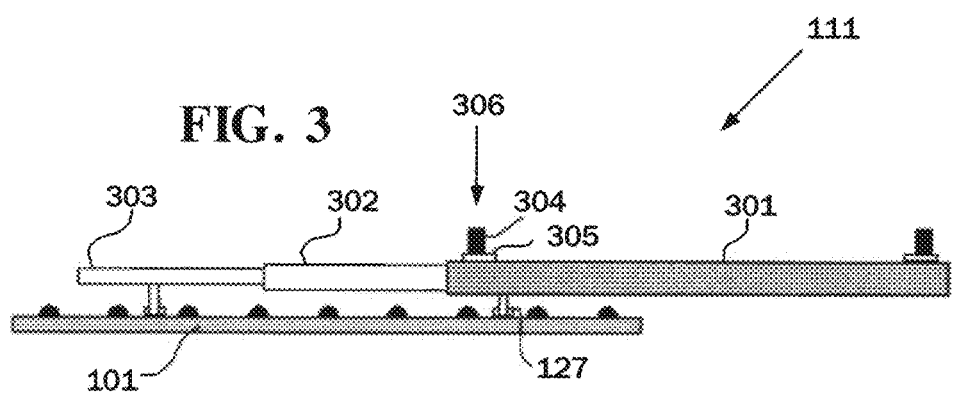
FIG. 3 shows a side view of the operation of one of the transfer arms according to the preferred embodiment of the invention.

Details of a transfer arm (111) are further illustrated in FIG. 3, as viewed from the front of the vehicle. Each transfer-arm assembly (111) consists of two nested telescoping members, an outer member (301) and inner member (302), which are slidably attached to a frame (303), which is in turn movably mounted on tracks (127) on the floor of the payload bay (110) to align properly with a target carrier tray. At each end of each outer telescoping member is a finger tab assembly (306), which consists of a finger tab (304) and an actuator (305) that can rotate the finger tab (304) ninety degrees to either of two positions: a vertical (passive) position and a horizontal (active) position. The finger tab (304) remains in the vertical position except when it is involved in an interaction with a carrier tray (200), as in a transfer into or off of the payload bay (110). For this purpose it is placed next to a notch (202) in a carrier tray (200) and rotated into the horizontal position in the direction of the carrier tray (200), actually entering the notch (202) to create an interference with the carrier tray. When the telescoping members (301, 302) then move laterally in either direction, the finger tab (304) encounters the vertical wall of the notch (202), so that continued motion of the telescoping members (301, 302) moves the carrier tray. The telescoping members (301, 302) can extend in both directions, right and left, so that the transfer arms (111) can transfer a carrier tray to/from either side of the vehicle. Motors and transmission means such as pulleys or gears (not shown) effect both the lateral movement of the telescoping members (301, 302) and the longitudinal movement of the frame (303) in the tracks (127) on the floor of the payload bay (110).

Figure 4A:
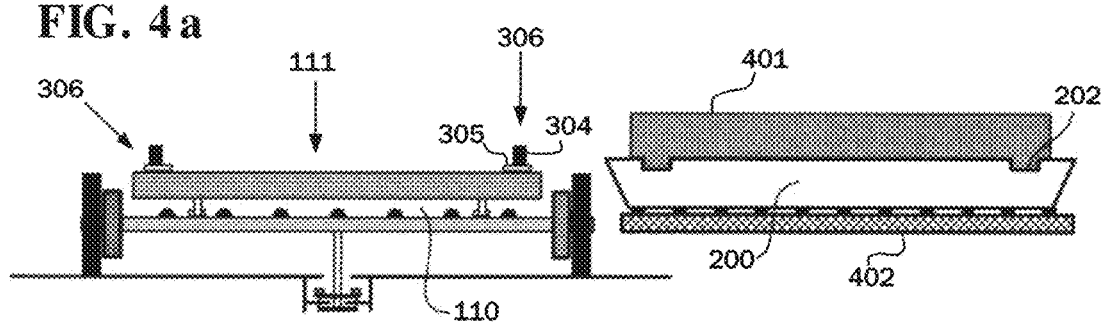
FIGS. 4a through 4c show a side view of the sequence of transferring a payload from storage rack onto payload bay according to the preferred embodiment of the autonomous transfer and transport vehicle.
Figure 4B:
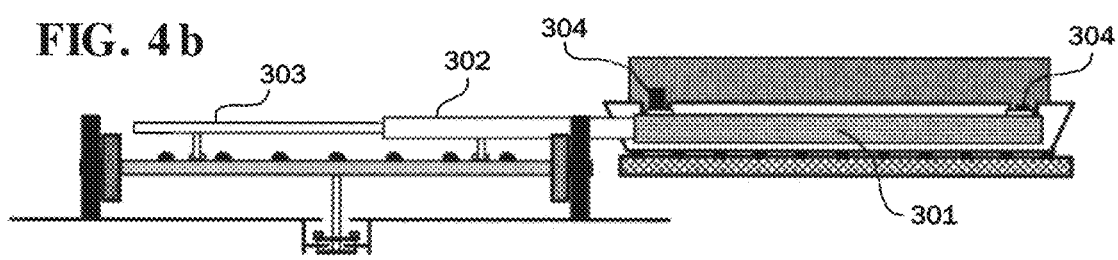
Figure 4C:
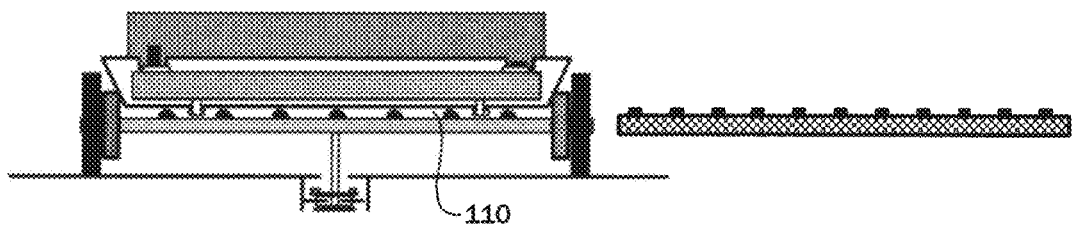

The operation of the transfer mechanism to transfer a payload is further illustrated in FIGS. 4a through 4c. The T3V begins the transfer sequence by positioning itself next to the target carrier tray (200) containing the case payload (401) resting on a base platform (402), as depicted in FIG. 4a, and independently moving both transfer-arm assemblies longitudinally to align with the edges of the target tray. Then, as illustrated in FIG. 4b, the two telescoping members (301, 302) of each transfer-arm assembly (111) are extended to the point at which the forward finger tab (304) on each arm is aligned with the rearmost notch (202) on the carrier tray (200), and the finger tab (304) is rotated downward by the actuator (305) into the notch (202). The telescoping members (301, 302) are then retracted back towards the T3V, causing the finger tab (304) on each arm to pull the target carrier tray (200) and case payload (401) in the same direction until, as shown in FIG. 4c, the payload is fully onboard and resting on the rollers on the payload-bay (110) floor. The transfer from the payload bay (110) onto a base platform (402) occurs in the exact reverse sequence: the T3V positions itself in front of the empty space where the carrier tray is to be placed, adjusting the longitudinal position of the carrier tray as necessary (FIG. 4c), extends the telescoping members of both transfer arms with the active finger tabs still engaged in the notches, thereby pushing the carrier tray from the payload bay completely onto the base platform (FIG. 4b). The finger tabs are then rotated upward into the passive vertical position, and the telescoping members are retracted back to their normal nested position, leaving the carrier tray on the base platform (FIG. 4a).

Figure 5A:
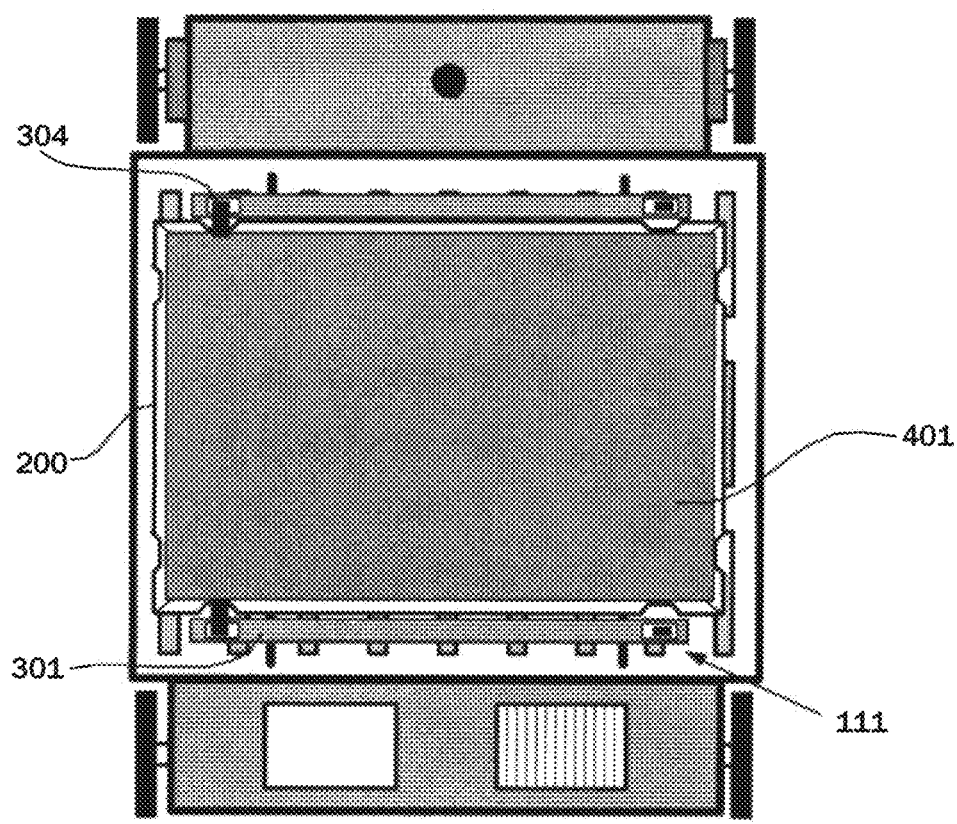
FIG. 5a and FIG. 5b show top and side views, respectively, of the autonomous transfer and transport vehicle with a payload onboard, according to the preferred embodiment of the invention.
Figure 5B:
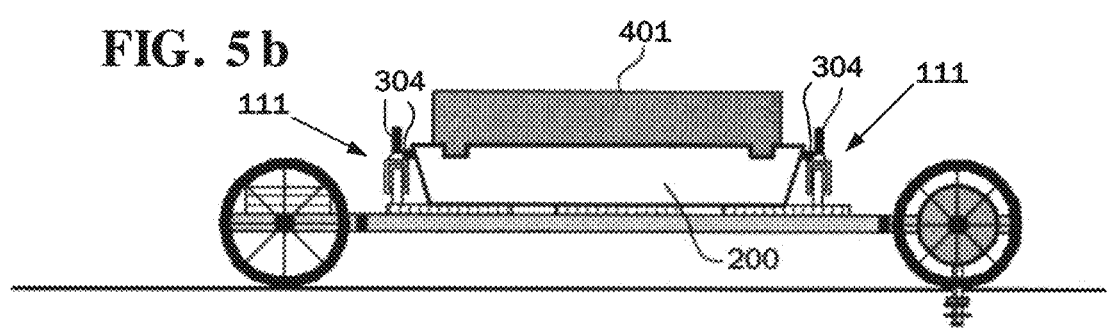

After a T3V has performed its transfer function to pull a payload onto its payload bay, it holds the payload in place while it performs its transport function of conveying the payload to wherever the case of merchandise needs to be taken. FIG. 5a and FIG. 5b show top and side views of the T3V with a payload onboard. The active finger tabs (304) remain engaged in their notches to prevent lateral movement of the carrier tray during T3V movement, and the transfer arms (111) themselves prevent longitudinal movement of the payload. By moving along the longitudinal track (127), the transfer arms (111) can also be used to adjust the position of the carrier tray on the payload bay. If necessary or desirable in an application, it is possible to increase the number of finger tabs used to engage a carrier tray, and/or incorporate other locking mechanisms, in order to increase the security of the hold of the payload on the T3V.

Figure 6:
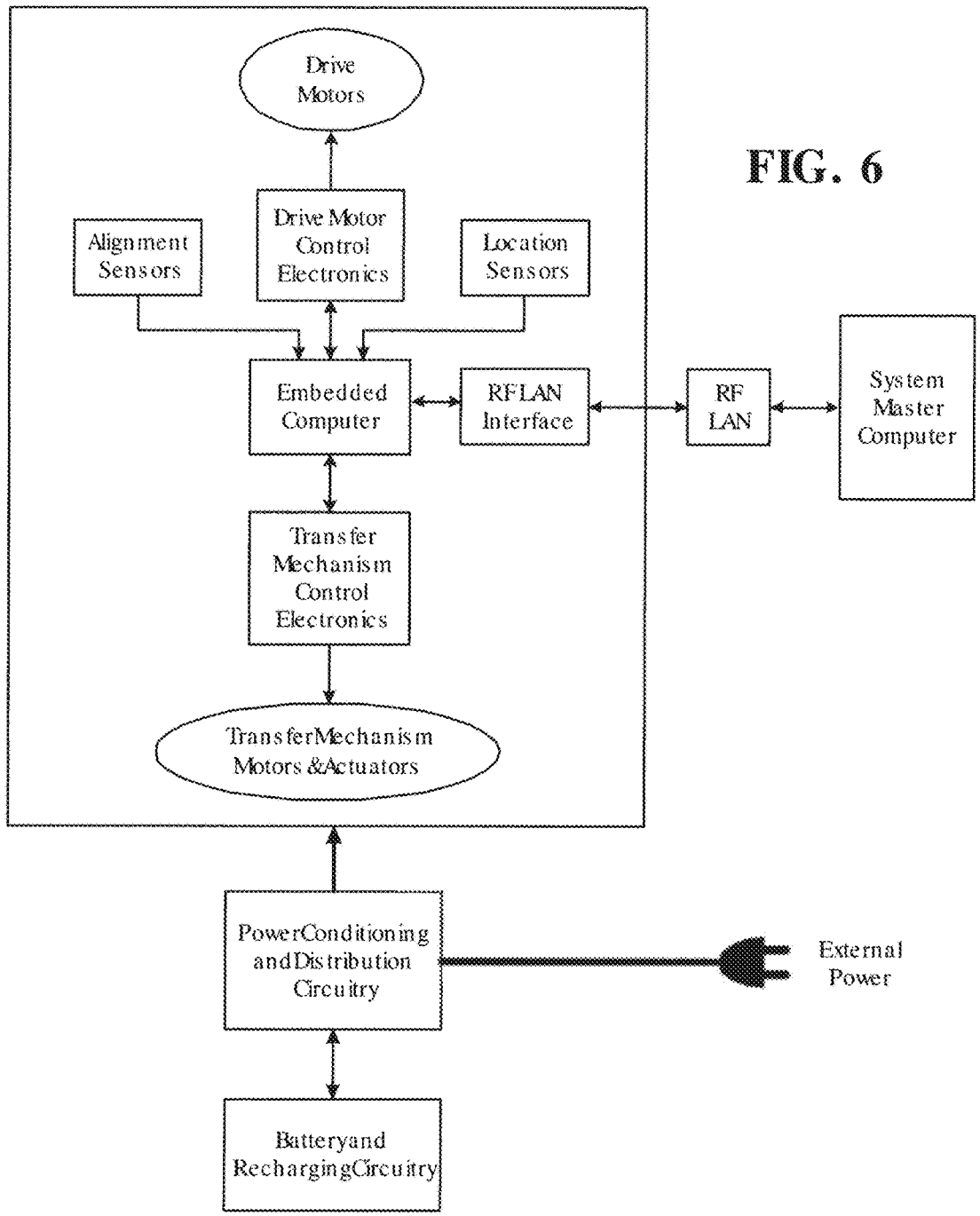
FIG. 6 is a topological block diagram of the computer and electronic and electrical subassemblies of the preferred embodiment of the autonomous transfer and transport vehicle.

In the preferred embodiment of the invention, the T3V is an electrically powered vehicle with a number of onboard electric motors and actuators, and includes a variety of electronic components used for control, sensing, and communication. FIG. 6 is a block diagram of the major electrical and electronic components of the T3V. The primary of these is the embedded control computer that manages all operation of the autonomous vehicle. This is a conventional microcomputer with a CPU, memory, software stored in memory (firmware), and a number of input/output ports. The control computer governs the operation of the drive motors (106, 107) and the motors and actuators in the transfer arms (111) by means of control electronics, and uses input from onboard sensors to control the interaction of the T3V with surrounding environment.

Location sensors are critical to enabling the T3V to determine its location with the work facility at any moment in time. In the preferred embodiment, the location sensors (128) are optical readers (with integrated light emitters) mounted on the bracket (119) of the pin-tip subassembly (117), one on each side, facing up toward the underside of the roadway (129) surface, where they can read location-encoded optical indicia placed on that underside surface. Continuous strips of optical indicia are installed along the entire guideway, one placed on each side of the slot at a point (130) on the underside surface, facing down to be read by the optical reader that is facing up, where they will be well protected from dirt or other contamination that might interfere with readability. The strips have barcodes at intervals along the way, with additional interval markers between the barcodes. As the T3V moves along the guideway, the pin-tip assembly (117) passes underneath the optically-encoded strip and the optical readers (128) decode the barcodes and sense the optical interval markers between barcodes, inputting this data to the control computer. The barcoded data can contain location information directly or contain arbitrary values that are linked to a location map in a database. The optically-encoded location indicia can be used not only for purely navigational purposes, but also as operational aids to the control computer. For example, the firmware in the embedded control computer can use these indicia to identify the points within a fork where the various actions of the drive motors are required as described earlier.

Also essential are the alignment sensors that make possible the "hand-eye" coordination of the precise movements of the transfer mechanism in performing a transfer operation. Indeed, in the preferred embodiment, this analogy is rather literal, as the alignment sensors are simple miniature cameras (also with integrated light emitters). Two cameras are collocated with the finger-tab assembly (306) on each end of each transfer arm. One of the cameras in each pair faces in the direction of movement of the transfer arm and is used to align the arm with the edge of the target carrier tray, while the second camera faced towards the center of the T3V payload bay and is used to align the finger tab with the target notch in a target carrier tray. The operational performance of these sensors is also enhanced (and the design itself simplified) by placing reflective markers on the carrier trays themselves.

Additional sensors that can prove advantageous are those that provide status information to the embedded control computer about T3V components, such as drive-wheel RPM and pressure-sensor feedback from the guide-pin assembly, and object-proximity detectors for fail-safe collision-avoidance.

In the preferred embodiment of the invention, the embedded control computer communicates with a system master-control computer by means of an onboard radio-frequency local-area network (RF LAN) interface, such as one based on IEEE 802.11b standards.

Operation of the electric motors, actuators, and all of the electronics in the T3V obviously requires a source of electric power, as well as power-conditioning and distribution circuitry. There are basically two choices: electrifying the guideway and equipping the T3V with contact pick-ups, along the principles used to power electric trains, or use rechargeable batteries, which is the simplest approach and for that reason the one used in the preferred embodiment. Of course, these choices are not mutually exclusive. For example, it may be advantageous to use rechargeable batteries to avoid the expense and reliability issues involved with electrifying all guideways throughout the facility, but to electrify the guideways around workstations, where T3Vs must spend significant amounts of time moving slowly and queuing for transaction. In this way it would be possible for T3Vs to recharge their batteries without having to reduce duty cycle by taking themselves offline to go to a recharging station.

Figure 7:
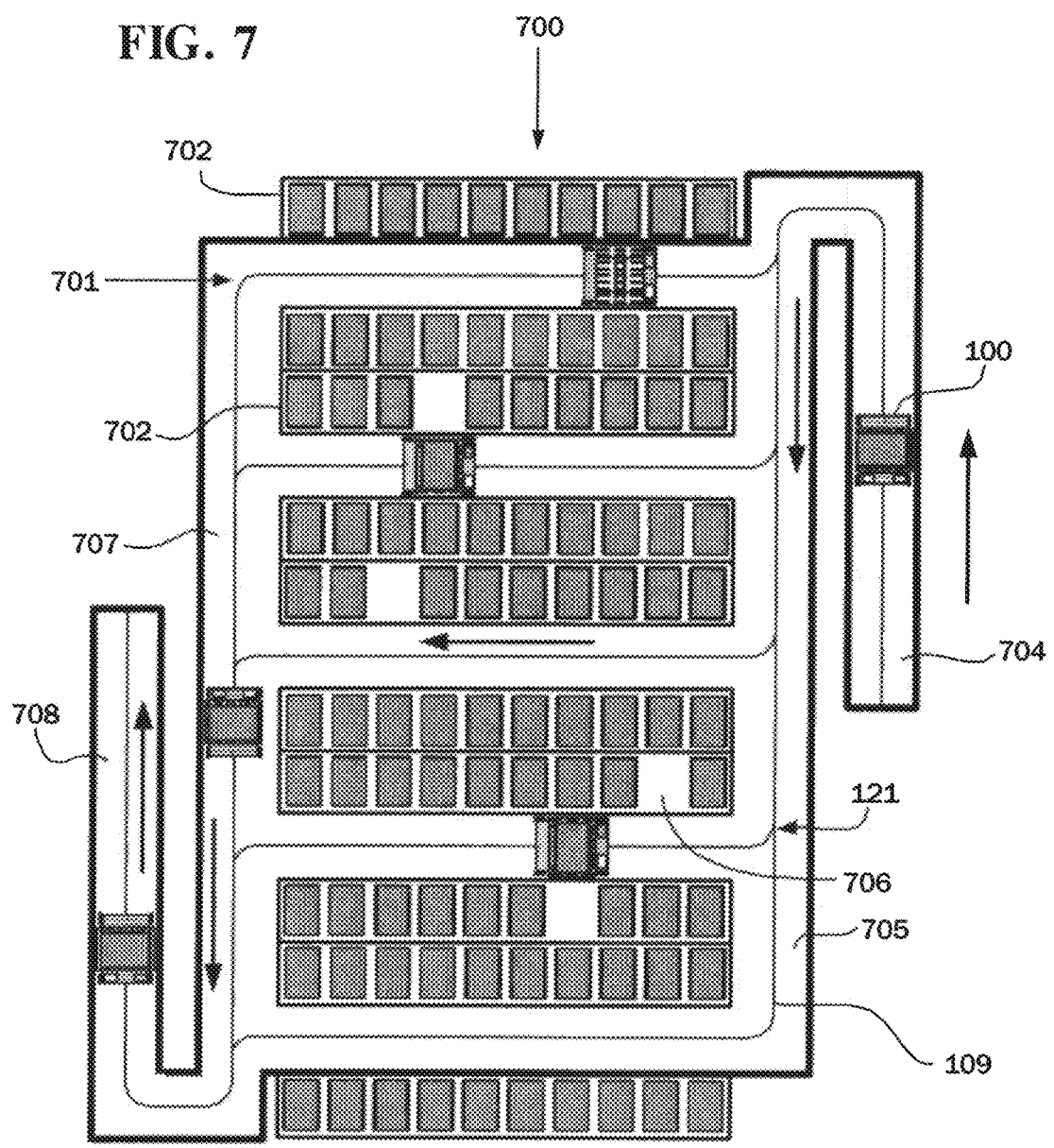
FIG. 7 is a top view of one level of the storage structure according to the preferred embodiment.
Figure 8:
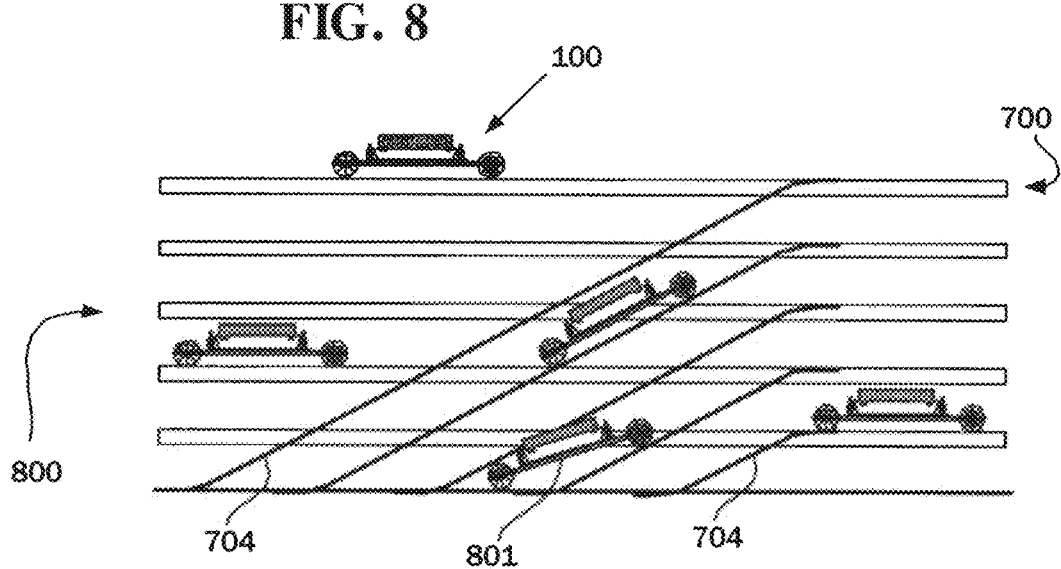
FIG. 8 is a partial side view of a storage structure according to the preferred embodiment.

An order-picking system will typically require a storage facility in which to place picking stock, i.e. the merchandise to be used in filling orders. In the present invention, this facility is a storage structure, typically having multiple levels, which essentially provides T3Vs random access to storage locations where carrier trays can be placed. FIG. 7 depicts a top view of a single level (700) of a storage structure according to the preferred embodiment of the invention, showing several T3Vs at work. Aisles (701) are formed by opposing rows of storage racks (702) separated by guideways within which T3Vs operate. A T3V travels up a guideway ramp (704) to reach the level (except for the ground-floor level, of course), travels down an entry guideway (705) to the specified aisle and turns through a fork (121) to enter the aisle, travels to the specified storage location (706), executes the specified transfer function either by pushing a carrier tray from its payload bay onto the storage rack (702) or pulling a carrier tray from the storage rack onto its payload bay, continues down the remaining length of the aisle, and turns onto an exit guideway (707) that leads down the exit ramp (708) back to ground level. To simplify traffic control and minimize opportunity for collisions, all travel is one-way. FIG. 8 shows a side view of a storage structure (800) with six levels (700), including the ground level, and the configuration of ramps (704) leading to each level (700).

In order to maximize storage density within the facility, the interval between two levels should be only high enough to allow clearance of the T3Vs operating on the lower level, as is drawn in FIG. 8. In that case, however, ramps to consecutive levels will not provide sufficient clearance for T3Vs to transition the change in pitch without hitting the next higher ramp if they are stacked directly above each other, as illustrated by the T3V (801) beginning the climb to level 3. The solution to this problem is to divide the set of ramps into two stacks, each consisting of ramps to alternate levels (one to odd-numbered levels and the other to even-numbered levels), and placing these two stacks side-by-side, as shown in FIG. 8, or one in front of the other.

Figure 9:
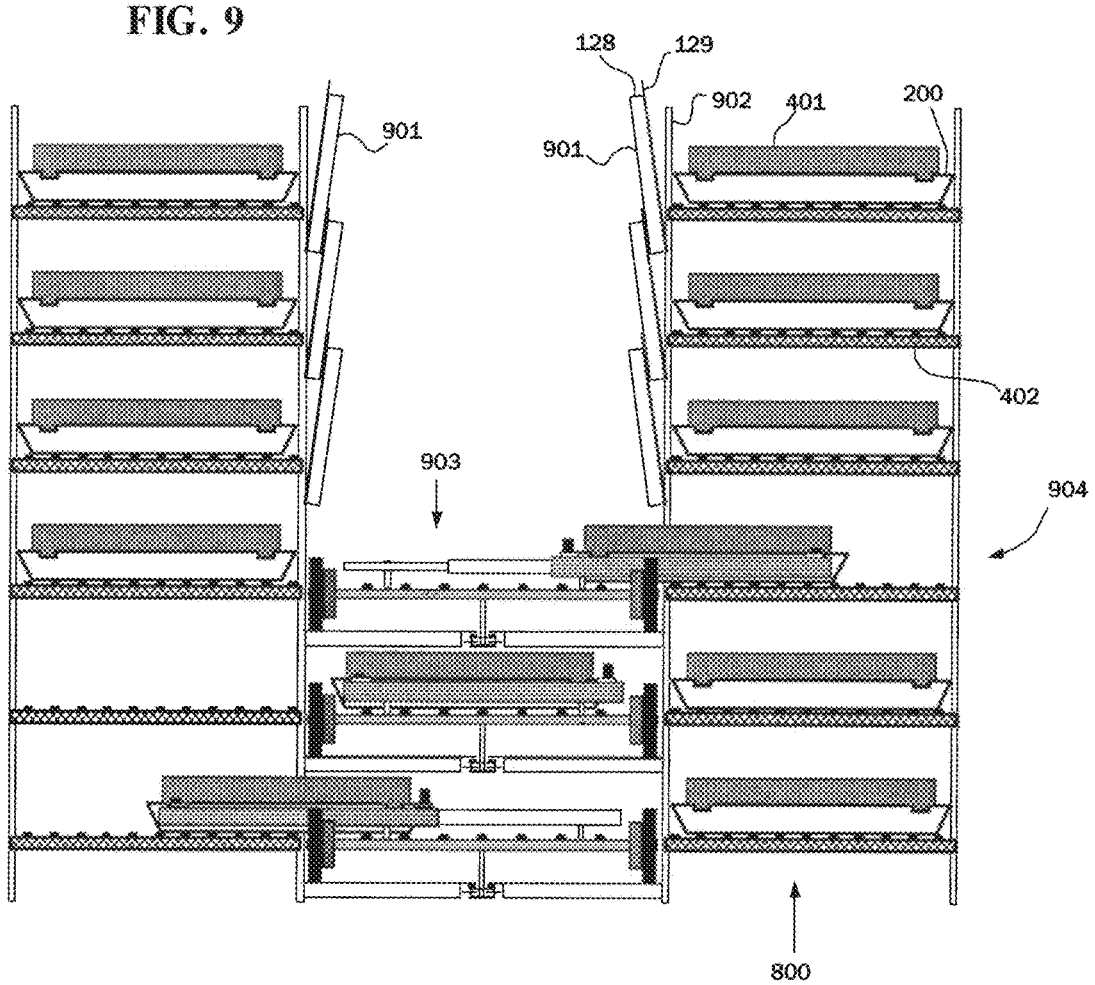
FIG. 9 is a cross-sectional view of a storage structure according to the preferred embodiment.
Figure 11:
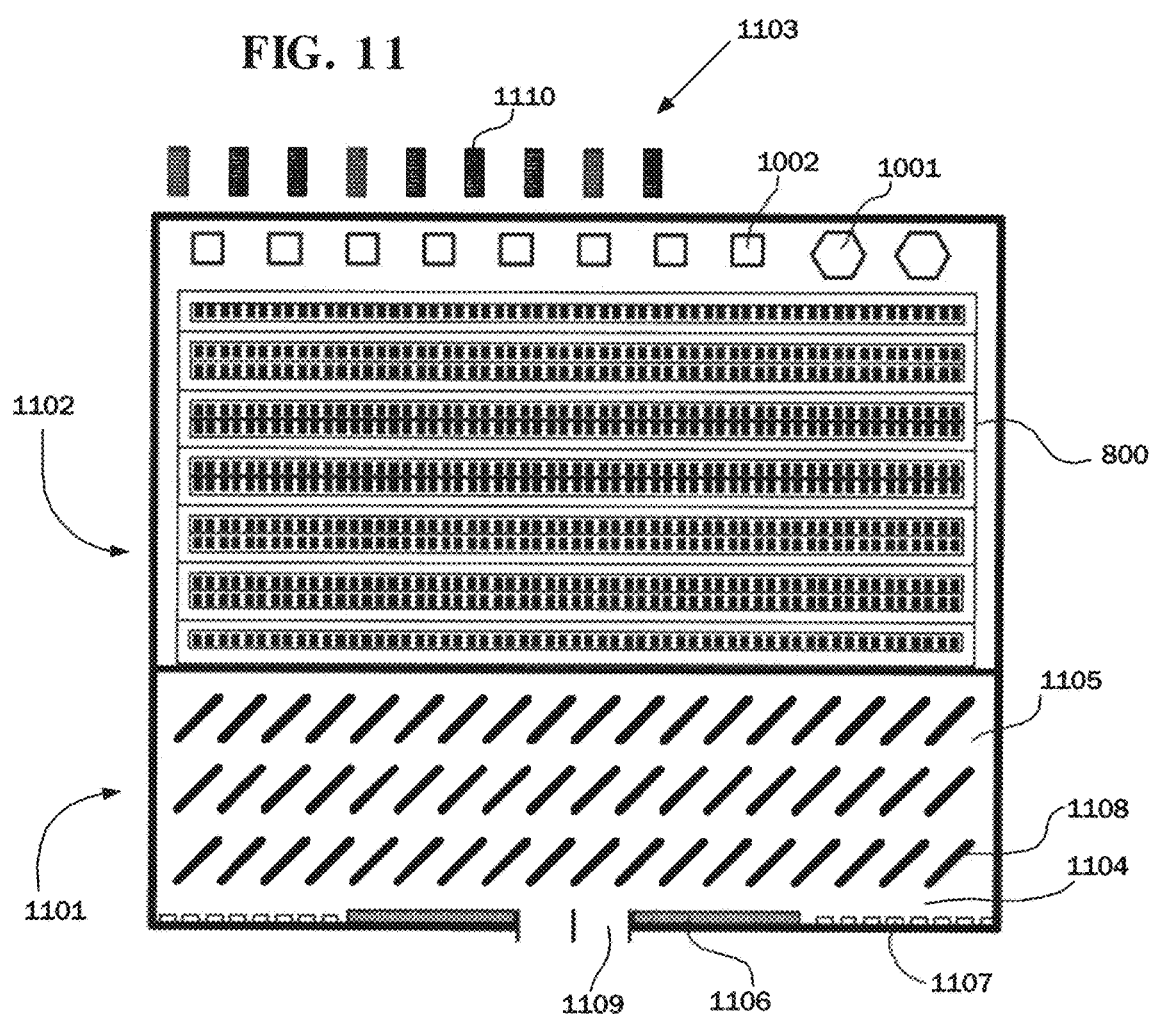
FIG. 11 is a simplified floor plan of an automated full-service retail store using the present invention.

One very practical problem that must be considered in the design of a high-density storage rack, in which the interval between levels may only be 18 inches or less, is how to gain access to a T3V that has malfunctioned within the interior of a lower level, as the spaces would be too tight for even small people to service the failed T3V. The solution to this problem is illustrated in a cross-sectional view of a storage structure (800) according to the preferred embodiment shown in FIG. 9, with six levels (700). In this design, guideways are made up of pairs of panels (901) that are attached rotatably, as with a hinge, to the support frame (902) of the storage structure (800) such that they can be opened up from above, as shown. Furthermore, all levels have identical layouts and are aligned vertically so that each aisle on a lower level is directly beneath the corresponding aisles on all higher levels. With this design, then, access to a failed T3V is gained from above by rotating open the guideway panels directly above the failed T3V one after another from the top level down. For example, as depicted in FIG. 11, suppose that the T3V (903) on the third level (904) of the six-level storage structure has failed in the middle of a transfer. The problem would be corrected by opening the guideway panels on the top level (sixth level) immediately above the failed T3V, then the corresponding guideway panels on the next two levels down to expose the problem T3V (903) so that corrective action can be taken through manual intervention. Once the problem has been corrected, the guideway panels (901) are returned to normal horizontal position in the reverse order and normal operations are resumed. During this entire procedure, operations must be suspended only within the one affected aisle on each of the affected levels. As shown in FIG. 9, T3Vs can continue to operate on the same aisle on lower levels, and also on all other aisles on all levels within the structure.

In some applications, the merchandise to be stored in the storage structure will include frozen and refrigerated products that require lower-than-ambient temperature control. To meet that requirement, the storage structure can be designed to permit sections to be lined with thermally insulating panels that isolate the air mass with those sections, thereby permitting efficient cooling of that air, with air curtains or plastic-strip curtains that permit T3Vs to enter and exit aisles within the refrigerated or frozen sections while preventing significant loss of cooled air.

As has been noted, in the preferred embodiment of the present invention, the operation of all T3Vs within a work facility is controlled by a system master computer, which communicates with individual T3Vs via an RF-LAN. The system master computer performs a number of executive processes within a given application, but the two processes that directly affect the T3Vs are task scheduling and traffic control. The task-scheduling function takes as input a stream of tasks that need to be performed by T3Vs within a rolling window of time into the future, and the fleet of operational T3Vs available to perform those tasks, and produces a rolling schedule specifying which tasks are to be performed by which T3Vs at what times. A simple example of a scheduled task for a given T3V might be: go to location A to arrive by time X, transfer carrier tray from base platform on right side of vehicle onto payload bay, take payload to location B to arrive by time Y, and transfer onto base platform to left of vehicle. (The task-scheduling software is responsible for managing the entire fleet of operational T3Vs, so that any time there is idle T3V capacity, i.e., fewer T3Vs needed to perform tasks than are available, the task-scheduler will create a "park and wait for further instructions" task.)

The scheduled tasks that are output by the task-scheduling process on the system master computer are then input to the traffic-control process, which performs a function very similar to what air-traffic controllers do in the system of air travel. The traffic-control function decomposes each scheduled task into a series of very specific routing instructions, or "vectors", that ensure that the task is accomplished successfully while avoiding collision with any other T3V. For example, the traffic-control process would instruct the T3V, starting from a specified location at a specified time, to accelerate at a specified rate to a specified speed, maintain that speed for a specified time in order to arrive at a second specified location at a second specified time, decelerate at a specified rate to a lower specified speed, execute a turn at a specified fork to change to a different guideway, etc. These instructions are transmitted to the T3V over the RF-LAN, along with a time-synchronization signal to ensure the T3V operates on the same time-base as the system master computer. At this point, the T3V assumes responsibility for executing those routing instructions precisely as given. The T3V also reports back in to the traffic-control process as each routing instruction is performed to provide a feedback loop, in effect permitting the traffic-control process to create a virtual "radar screen" of all T3V activity and ensure that operations are going as planned. Of course, when unexpected events occur and operations don't go as planned, both of these processes must have robust problem-solving logic to try to stabilize operations, which would include raising alerts and/or alarms to human supervisory staff to take action.

Note that this recommended software architecture is only one possible approach to solving the general management-and-control problem inherent in a large-scale parallel system such as this. It has the advantage of running the most complex software processes in the system master computer, which can be a very powerful server-class machine, rather than in the T3Vs embedded control computer, thereby minimizing the amount of computational power—and thus the cost-required in the T3V itself. Those skilled in the art, however, will recognize that other methods and embodiments are readily possible.

Applications of T3V

Figure 10:
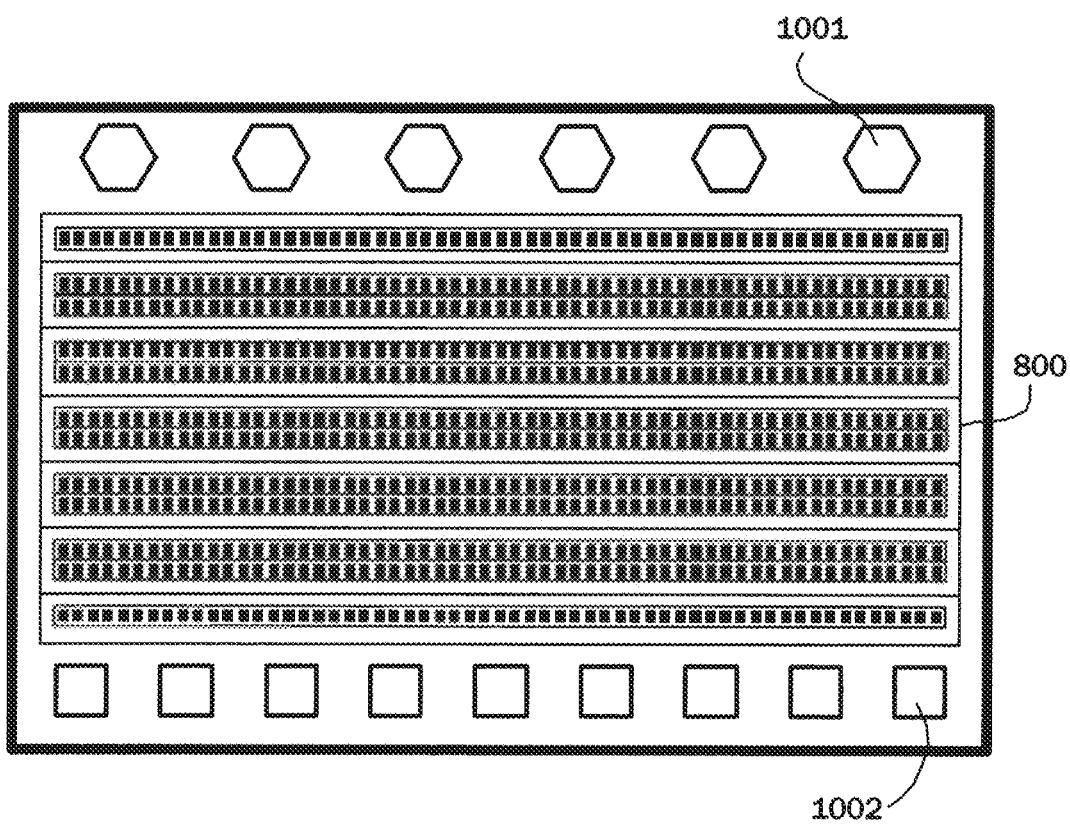
FIG. 10 is a simplified floor plan of an order-picking facility using the present invention.

As mentioned earlier, the T3V system solves the general problem of automating order-picking by making possible a highly efficient goods-to-man operating model in the short term and a goods-to-robot model in the longer term. To show how this solution works in practice, FIG. 10 shows a simplified example of a floor plan of an order-picking facility using the present invention, illustrating both a retail distribution center where orders are picked at case level and an item-level order fulfillment center.

In a retail DC using the present invention, the order picking process begins at depalletization workstations (1001) with the removal of cases from single-product pallets received from suppliers, either immediately upon arrival or after having been placed into temporary storage. At each workstation, cases are taken off the pallet either manually or preferably by completely automated depalletizing machines that are commercially available at present, and sent down a conveyor. In accordance with the preferred embodiment of the present invention, which uses carrier trays to hold the cases, the next step within each workstation is the insertion of the singulated cases into the carrier trays, either by manual or preferably automated means. The output of each depalletizing workstation, then, is a stream of carrier trays, each holding a single case of merchandise. As instructed by the system master computer, more specifically by the task-scheduling and traffic-control processes running on that computer, T3Vs then come to a pick-up point at the workstation, transfer the carrier trays one at a time onto their payload bays, and (typically) transport each case into the storage structure (800) to a specified empty storage location and transfer the carrier tray onto the storage rack. Then, again as instructed by the system master-control computer as required for the building of outbound mixed pallets, T3Vs go to specified locations in the storage structure (800), transfer specified carrier trays at those locations from the storage racks onto their payload bay, transport these carrier trays to specified order-assembly workstations (1002) where mixed pallets are built. At each order-assembly workstation (1002), T3Vs transfer their carrier trays onto a conveyor at a drop-off point, and the cases are then removed from the carrier trays and placed on an outbound mixed pallet, either by manual or preferably by automated means. The carrier tray is then recycled for re-use. (It should be noted that, instead of transporting a case of merchandise into the storage structure to be retrieved on a subsequent transaction, a T3V can "cross-dock" it, i.e. transport it directly to a pallet-building workstation to be used immediately, thereby effectively saving most of an entire round-trip transaction. Because this is the most efficient use of T3V resources, the system master-control computer generally tries to schedule depalletization and palletization activities to maximize opportunities to cross-dock.)

In an item-level order-fulfillment center using the present invention, the order picking process is very similar to the case-level process described above. In fact, there are only two significant differences: an additional step at the depalletization station is the removal of the case top to expose individual item units for picking, and cases are returned to the storage structure after each item pick unless empty. Thus, referring again to FIG. 10, the order picking process begins at depalletization workstations (1001) with the removal of cases from single-product pallets received from suppliers, either immediately upon arrival or after having been placed into temporary storage. At each workstation, the singulated cases immediately have their tops removed. Automated top-removal machines are commercially available that remove the top from a cardboard case while it travels down a conveyor by first passing it through a light-curtain to measure the case's dimensions and then passing it through cutting blades precisely positioned based on the measured dimensions to cut the case material along all four sides of the box, after which a suction mechanism adheres to the top and pulls it away. With their tops off to expose individual item units for picking, the cases are then inserted into carrier trays, either by manual or preferably automated means. The output of each depalletizing workstation (1001), then, is a stream of carrier trays, each holding a single open-top case of merchandise. As instructed by the system master computer, more specifically by the task-scheduling and traffic-control processes running on that computer, T3Vs then come to a pick-up point at the depalletization station (1001), transfer the carrier trays one at a time onto their payload bays, and then transport each case into the storage structure (800) to a specified empty storage location and transfer the carrier tray onto the storage rack. Then, again as instructed by the system master-control computer as required for the picking of items to fill orders, T3Vs go to specified locations in the storage structure, transfer specified carrier trays at those locations from the storage racks onto their payload bay, and transport these carrier trays to specified order-assembly workstations (1002). In an item-level order-fulfillment center, order assembly involves a pick-and-pack process in which a specified number of items are removed from the case and placed in an outbound shipping container such as a box or tote. For the simplest possible process with the minimum number of transfers, the case payload remains on the T3V through the pick transaction. If there are any items remaining in the case after the pick is complete the T3V is instructed to return the carrier tray back to a specified location in the storage structure (usually but not necessarily the original location), otherwise the T3V is instructed to drop off the carrier tray at a recycling station where the empty case is discarded and the carrier tray recycled for re-use. The simplest and lowest cost process for handling outbound shipping containers once filled will typically be to place them in carrier trays and transport them by T3V to final shipping stations, since this uses the same system and only requires a small incremental increase in total number of T3Vs, but conventional conveyors can also be used.

At the time of this writing, there are very few commercially available robots or special-purpose machines that can be used to automate the order-assembly process at the case level, and none at the item level, though this is likely due to the lack of demand and that situation can be expected to change if the present invention becomes widely used. However, even if the order-assembly process is performed manually, the present invention results in a very large increase in productivity—on the order of four or five times—compared to conventional man-to-goods methods today. Indeed, with the present invention it is possible for a single human operator to fulfill item-level orders at a rate of 1,000 item-picks per person-hour, so that only five operators can pick as many items-5,000 or so per hour—as might be purchased in a typical retail store at peak volume.

The present invention, then, makes possible a new operating model for a retail store far different than the conventional self-service store: the automated full-service store, in which customers shop by ordering items with an electronic shopping terminal instead of collecting them in shopping carts, and the orders are then picked in real time and delivered to pick-up bays for the customers to pick up as they leave the store.

FIG. 11 a simplified floor plan illustrative of an automated full-service store based on the present invention. The store is divided into two major sections, a shopping section (1101) where customers select the items they wish to purchase, and an order-fulfillment section (1102). An order pick-up area (1103) is located outside the store.

The order fulfillment section (1102) is essentially a smaller-scale version of the item-level order-fulfillment center described above. Cases of merchandise arrive at the store on mixed-product pallets shipped from a distribution center and are processed at a depalletizing station (1001) in exactly the same way as described above: cases are transferred from the pallet to a conveyor, have their tops removed, are inserted into carrier trays, picked up by T3Vs, transported into the storage structure (800), and transferred onto a storage rack. As required to fill customer orders, T3Vs also retrieve cases containing ordered items from the storage structure, transport them to order-assembly stations (1002) where the ordered number of items are removed from each case and placed into a shopping bag (or equivalent container), and then either return the cases to the storage structure (800) or, when empty, drop cases off at a recycling station. In the preferred embodiment of the automated store, the shopping bags are self-supporting, placed in carrier trays, transported to the order-assembly stations by T3Vs, and then once filled transported by T3Vs to the pick-up bays.

The shopping section (1101) includes a lobby area (1104) and a product-display area (1105). In the lobby (1104), preferably along a wall to save floor space, is a bank shopping terminals (1106), and a number of automated checkout stations (1107).

The shopper goes through the entry way (1109) into the store lobby (1104), picks up a shopping terminal, and then shops in the product-display area, where item units are placed on display fixtures (1108) for examination and evaluation only. Typically, there is only one display unit per product, though retailers may add additional display units of certain products for promotional emphasis or to reduce contention for high-volume items. The shopper handles display units for informational purposes in order to make purchase decisions, but then returns them to their places on the display fixtures. The actual order is created by scanning the UPC barcodes printed on display-item packages and on their shelf labels. (Note that other machine-readable identifiers could be used, such as RFID tags or touch-memory buttons, but UPC barcodes are used in the preferred embodiment for reasons of simplicity and low cost.)

In the preferred embodiment of the automated store, the shopping terminal is essentially a mobile battery-powered computer consisting of a CPU, memory, a wireless network interface (such as 802.11b), a barcode scanner, and a user interface consisting of a screen that displays information to the user, buttons and/or a transparent touch-screen overlay that accept touch-input from the user. The software on the scanner includes an operating system (such as Linux), a browser (such as Opera), and device drivers. Application-server software running on the system master computer produces the information to be displayed on the screen. The browser on the shopping terminal controls the interactive exchange of information between the terminal and the application-server software and displays server-provided information on the terminal's screen. Stored in the memory of each shopping terminal is a unique identifier used to identify the terminal (and therefore the shopper) to the application-server software. Two examples of existing commercially available hand-held devices that could be used as the shopping terminal are the PPT2800 and the PDT7200 from Symbol Technologies, Inc.

When a customer scans a UPC to order an item, the application-server software first checks the on-hand availability of that item. If there is an unreserved unit of the item in the order-fulfillment section, the application-server software reserves it for the shopper and transmits back to the terminal's browser a screen update showing the item's description, its price, and the new order total including the item. On the other hand, if there is no unreserved unit of the item in the order-fulfillment section, the application-server software transmits back an out-of-stock advisory so the shopper can immediately make an alternate selection. At any time during the shopping trip, the customer can cause the terminal to display a list of the customer's order showing a description of each item ordered and its cost, and the total cost of the complete order. Typically items can only be added to the list by scanning product UPCs as described above, but the number of units of any item already on the list can be easily changed using the touch screen interface and/or the buttons on the front of the terminal. For example, the customer might scroll up or down the list and select an item, and then change the order by incrementing or decrementing the number of ordered units for that item. (Also, once an item has been added to the order list, each subsequent scan of the item's UPC barcode increments the number of units that item in the order, e.g., scanning an item's barcode three times is an order for three units of that item.) With each increment of the number of units of an item order, the computer follows the same procedure described above: it checks available stock, reserves an item unit if available, and updates the terminal's screen to show the order with the additional item unit or an out-of-stock advisory. With each decrement of the number of units of an item order, the central computer updates the terminal's screen to reflect the removal of the item unit, and also removes the "reservation" previously placed on that item unit in the picking stock, freeing it to be ordered by another customer. (If the number of units for an item ordered by a customer is reduced to zero, the item description is not removed from the order list but continues to be displayed with a zero unit count. Decrementing the item order further will have no effect, but the customer can increase the item order again through the screen/button interface without having to physically return to the item's shelf location.)

Once the shopping trip is complete, the shopper proceeds to an available checkout station (1107) located in the lobby. Resembling an ATM at a bank, each checkout station (1107) is itself a computer with a CPU, memory, network interface (wireless or wired), and an array of peripheral devices that include a coupon capture device, a cash exchanger, a magnetic card reader, a printer, and a touch-sensitive screen. Each checkout station also has an identifying barcode located prominently on its face, and the customer initiates the checkout procedure by scanning this barcode with the shopping terminal, which activates the checkout station and deactivates the shopping terminal. After making any last-minute quantity changes, the customer commits the contents of the order and makes payment using coupons, cash, and/or electronic funds transfer. By installing an abundance of checkout machines, the retailer can effectively eliminate the need for any customer to waiting in line at checkout.

In general, the system master computer waits until the customer has committed the order before beginning the order-picking process described above so that the customer can change the quantity of any ordered item at any time without cost to the retailer. If a customer changes the quantity of an ordered item after it has been picked, a second transaction will be required-either a duplicate pick or a "reverse pick" in which the item is removed from the bag and placed back into the case. Another advantage of waiting until order confirmation is that the software on the system master computer can better optimize the distribution and combinations of items among multiple bags when the total set of items is known. During peak period of demand, however, it may be necessary to pick parts of some orders prior to final confirmation in order to maximize utilization of T3Vs and maintain acceptable service levels.

Once payment is complete, the checkout station (1107) prints out a paper receipt that includes a barcoded identification number. The screen displays a message which thanks the customer for shopping at the store, requests return of the shopping terminal, and advises the customer of the approximate length of time before the order will be ready for pickup. The customer then returns the terminal to the bank of shopping terminals, proceeds to his or her car, and drives to the pickup area (1103). At the pickup area (1103), a sign directs the customer to a specific pick-up bay (1110), where the customer's order will have been delivered by T3Vs. The barcode on the receipt is scanned for validation, and the order is then released for loading into the customer's car, either by the customer or by a store associate.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. A method for combining a selection of different products in a distribution facility, said method comprising:
    providing a storage having stacked levels of storage locations, each of said storage locations being located immediately adjacent to a vehicle support roadway in a network of roadways with more than one roadway level so that each roadway level is at a different one of the stacked levels of storage locations, at least one roadway of said network including a branching location at which the at least one roadway divides into different branching roadways which lead to different ones of said storage locations;
    providing a source transfer station connected to one of said roadways in said network of roadways;
    providing a destination order assembly station connected to one of said roadways in said network of roadways;
    providing a plurality of wheeled transport vehicles, each given one of said vehicles being movable from its current location in said network of roadways to a specified target location in said network of roadways via a selected one of said branching roadways at each branching location that said given one said vehicles encounters through said network from said current location to said target location;
    unpalletizing shipping cases where each of said vehicles further includes a transfer mechanism for transferring at least one unpalletized shipping case, forming a not palletized case payload, to and from said vehicle;
    storing a multiplicity of different products in said storage by repeatedly:
        moving said vehicle to said source transfer station, individually transferring, with said transfer mechanism on said selected vehicle, the not palletized case payload of the at least one unpalletized shipping case holding a plurality of individual packages where each of the packages, of each of the at least one shipping case, contains the same kind of product, the not palletized case payload being individually transferred to said selected vehicle at said source transfer station, moving said selected vehicle along said network carrying said not palletized case payload from said source transfer station to a designated one of said storage locations, and individually transferring, with said transfer mechanism on said selected vehicle, the not palletized case payload of the at least one unpalletized shipping case from said selected vehicle to said designated storage location; and retrieving and combining a selection of different products stored in said storage by repeatedly:

moving said specified vehicle to a specified one of the storage locations, where a given one of said different products is stored, individually transferring, with said transfer mechanism on said specified vehicle, an unpalletized shipping case stored at said specified storage location to said specified vehicle to form a not palletized case payload of at least one stored shipping case, moving said specified vehicle along said network carrying said at least one stored shipping case from said specified storage location to said destination order assembly station, and transferring the at least one stored shipping case from said specified vehicle to said destination order assembly station.

2. The method as set forth in claim 1, wherein the stacked levels of storage locations comprises a plurality of vertically stacked storage levels and wherein each of said storage levels comprises multiple storage locations positioned on a given one of said vertically stacked storage levels immediately adjacent to a substantially level subnetwork of roadways positioned on said given one of said vertically stacked storage levels.

3. The method as set forth in claim 2, further including at least one inclined ramp roadway for transporting said wheeled transport vehicles from a subnetwork of roadways on one of said storage levels to a subnetwork of roadways on a different one of said storage levels.

4. The method as set forth in claim 1, wherein each of said wheeled transport vehicles is self propelled by a drive motor mounted on said vehicle and coupled to least one of its wheels.

5. The method as set forth in claim 4, wherein said motor is responsive to commands from a programmed processor for controlling the vehicle's velocity.

6. The method as set forth in claim 1, wherein each of said wheeled transport vehicles includes a steering mechanism for following a selected one of said branching roadways when one of said branching locations is encountered in said network of roadways.

7. The method as set forth in claim 1, further comprising determining and storing data accessible to a programmed processor indicating the current position of each of said wheeled transport vehicles on said network of roadways.

8. The method as set forth in claim 1, wherein each given one of said wheeled transport vehicles further includes a propulsion and guidance mechanism for moving said given one of said vehicles from its current location in said network of roadways to a specified target location in said network of roadways.

9. An automated product selection system for combining a selection of different products in a distribution facility comprising:

a storage having stacked levels of storage locations, each of said storage locations being located immediately adjacent to a vehicle support roadway in a network of roadways with more than one roadway level so that each roadway level is at a different one of the stacked levels of storage locations, at least one roadway of said network including a branching location at which the at least one roadway divides into different branching roadways which lead to different ones of said storage locations;

a source transfer station connected to one of said roadways in said network of roadways;

a destination order assembly station connected to one of said roadways in said network of roadways; and a plurality of wheeled transport vehicles, each given one of said vehicles being movable from its current location in said network of roadways to a specified target location in said network of roadways via a selected one of said branching roadways at each branching location that said given one said vehicles encounters through said network from said current location to said target location, where each of said vehicles further includes a transfer mechanism for transferring at least one unpalletized shipping case, forming a not palletized case payload, to and from said vehicle;

wherein each of said wheeled transport vehicles is configured to:

traverse the network of roadways to said source transfer station, individually transfer, with said transfer mechanism on said selected vehicle, the not palletized case payload of at least one unpalletized shipping case holding a plurality of individual packages where each of the packages, of each of the at least one shipping case, contains the same kind of product, the not palletized case payload being individually transferred to said selected vehicle at said source transfer station, traverse said network of roadways carrying said not palletized case payload from said source transfer station to a designated one of said storage locations, individually transfer, with said transfer mechanism on said selected vehicle, the not palletized case payload of the at least one unpalletized shipping case from said selected vehicle to said designated storage location, so that a multiplicity of different products are stored in said storage; and wherein each of said wheeled transport vehicles is further configured to:

traverse the network of roadways to a specified one of the storage locations, where a given one of said different products is stored, individually transfer, with said transfer mechanism on said specified vehicle, an unpalletized shipping case stored at said specified storage location to said specified vehicle to form a not palletized case payload of at least one stored shipping case, traverse along said network of roadways carrying said at least one stored shipping case from said specified storage location to said destination order assembly station, and transfer the at least one stored shipping case from said specified vehicle to said destination order assembly station, so that a selection of different products stored are retrieved and combined.

10. The automated product selection system as set forth in claim 9, wherein the stacked levels of storage locations comprises a plurality of vertically stacked storage levels and wherein each of said storage levels comprises multiple storage locations positioned on a given one of said vertically stacked storage levels immediately adjacent to a substantially level subnetwork of roadways positioned on said given one of said vertically stacked storage levels.

11. The automated product selection system as set forth in claim 10, further including at least one inclined ramp roadway for transporting said wheeled transport vehicles from a subnetwork of roadways on one of said storage levels to a subnetwork of roadways on a different one of said storage levels.

12. The automated product selection system as set forth in claim 9, wherein each of said wheeled transport vehicles is self propelled by a drive motor mounted on said vehicle and coupled to least one of its wheels.

13. The automated product selection system as set forth in claim 12, wherein said motor is responsive to commands from a programmed processor for controlling the vehicle's velocity.

14. The automated product selection system as set forth in claim 9, wherein each of said wheeled transport vehicles includes a steering mechanism for following a selected one of said branching roadways when one of said branching locations is encountered in said network of roadways.

15. The automated product selection system as set forth in claim 9, further comprising at least one sensor configured to determine and effect storage of data accessible to a programmed processor indicating the current position of each of said wheeled transport vehicles on said network of roadways.

16. The automated product selection system as set forth in claim 9, wherein each given one of said wheeled transport vehicles further includes a propulsion and guidance mechanism for moving said given one of said vehicles from its current location in said network of roadways to a specified target location in said network of roadways.

* * * * *